US006986002B2

(12) United States Patent
Raghavan

(10) Patent No.: US 6,986,002 B2
(45) Date of Patent: Jan. 10, 2006

(54) ADAPTIVE SHARED DATA INTERVENTIONS IN COUPLED BROADCAST ENGINES

(75) Inventor: Ram Raghavan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 10/322,075

(22) Filed: Dec. 17, 2002

(65) Prior Publication Data

US 2004/0117554 A1    Jun. 17, 2004

(51) Int. Cl.
G06F 12/08    (2006.01)
(52) U.S. Cl. ................ 711/141; 711/167; 711/120; 711/145; 711/146
(58) Field of Classification Search ................ 711/141, 711/146, 145, 167, 120, 119
See application file for complete search history.

(56) References Cited

U.S. PATENT DOCUMENTS

| | | | | |
|---|---|---|---|---|
| 5,548,740 A * | 8/1996 | Kiyohara | ................ | 345/543 |
| 6,393,522 B1 * | 5/2002 | Campbell | ................ | 711/120 |
| 6,601,144 B1 * | 7/2003 | Arimilli et al. | ............. | 711/146 |
| 6,631,447 B1 * | 10/2003 | Morioka et al. | ............. | 711/141 |
| 6,748,509 B2 * | 6/2004 | Litaize et al. | ................ | 711/170 |
| 6,760,819 B2 * | 7/2004 | Dhong et al. | ................ | 711/146 |

FOREIGN PATENT DOCUMENTS

JP    6274461    9/1994

OTHER PUBLICATIONS

"Processor Performance Monitoring With a Depiction of the Efficiency of the Cache Coherency Protocol of Superscalar Microprocessor in Ansymmetric Multiple Processor Environment"; IBM TDB, vol. 40, No. 1, Jan. 1997, pp. 79-81 XP000686109.*

* cited by examiner

Primary Examiner—Pierre-Michel Bataille
(74) Attorney, Agent, or Firm—Carr LLP; Diana R. Gerhardt

(57) ABSTRACT

The present invention provides for a bus system having a local bus ring coupled to a remote bus ring. A processing unit is coupled to the local bus node and is employable to request data. A cache is coupled to the processing unit through a command bus. A cache investigator, coupled to the cache, is employable to determine whether the cache contains the requested data. The cache investigator is further employable to generate and broadcast cache utilization parameters, which contain information as to the degree of accessing the cache by other caches, its own associated processing unit, and so on. In one aspect, the cache is a local cache. In another aspect, the cache is a remote cache.

24 Claims, 3 Drawing Sheets

ADAPTIVE SHARED DATA INTERVENTIONS IN COUPLED BROADCAST ENGINES

TECHNICAL FIELD

The invention relates generally to data transfer across a plurality of bus rings and, more particularly, to accessing data in a remote cache.

BACKGROUND

Computer buses are generally employed to transfer data between two or more elements in a computer system, such as between a microprocessor and random access memory, or from a floppy disk drive to a cache. Efficiently designed bus architecture is of increasing concern as the processing speeds of the elements coupled by the buses continue to increase.

One form of bus architecture comprises a ring topology. Generally, in a ring topology, information, which can comprise both commands to processing elements (PE) and data employed by the PE, is passed from PE to PE in a circular, pipe-lined manner. Furthermore, a plurality of ring topologies can be coupled together and share information. In other words, data transfers can occur from a local bus ring to a remote bus ring.

Bus rings also typically have a plurality of caches that store and transmit information that is to be forwarded through the bus ring topology. Each cache of the bus ring can have an associated processor unit (PU) and an associated cache investigator. Generally, the cache investigator responds to data transfer requests that it receives from the local bus ring, although the requests can originate on a remote bus ring. Generally, the cache investigator determines if its associated cache has the requested data, and the status of that data. Status can be generally defined as whether the data is "exclusive" (only that cache has a copy of the data from system memory), "shared" (that cache and probably one or more other caches have a copy of the data from system memory) or "modified" (the data has been altered since it was loaded from system memory). As part of the reply, the status is then broadcast to the local bus ring and from there to any coupled remote bus rings.

This status information is evaluated by data transfer logic to determine the appropriate action to take regarding the data transfer request. If data in a cache has been modified, this modified data is transferred to the requesting PE, whether on not the cache containing the modified data is on a local bus ring or a remote bus ring.

In conventional systems, if the data in the cache is unmodified, the data transfer logic typically instructs the bus ring to perform a cache-to-cache transfer of unmodified data if both the source cache and the destination cache are on the same bus ring ("node"), as this is generally regarded as faster than the transfer from shared memory to a local node. If the unmodified cache data is on a remote node, the transfer logic typically instructs the bus ring to download the information from the shared memory instead of from the remote cache, as this is generally regarded as faster than the data transfer from a remote node to a local node.

However, there are problems associated with this design approach. The time and resources required for data transfers to and from the local cache can be a substantial impediment to efficient utilization of the bus rings. Therefore, a bus data transfer system is needed which solves at least some of the problems of conventional bus data transfer systems.

SUMMARY

The present invention provides for a bus system having a local bus node and remote bus node coupled to the local bus node. A processing unit is coupled to the local bus node and is employable to request data. A cache is coupled to the processing unit. A cache investigator, coupled to the cache, is employable to determine whether the cache contains the requested data. The cache investigator is further employable to generate and broadcast cache utilization parameters. In one aspect, the cache is a local cache. In another aspect, the cache is a remote cache.

BRIEF DESCRIPTION OF THE DRAWINGS

For a more complete understanding of the present invention, and the advantages thereof, reference is now made to the following Detailed Description, taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or a microprocessor executing firmware, or some combination thereof. In one embodiment, dedicated integrated logic circuits that are encoded to perform such functions are used. In other embodiments, functions are performed by a processor, such as a computer or an electronic data processor, in accordance with code, such as computer program code, software, and/or integrated circuits that are coded to perform such functions, unless indicated otherwise.

Figure 1:
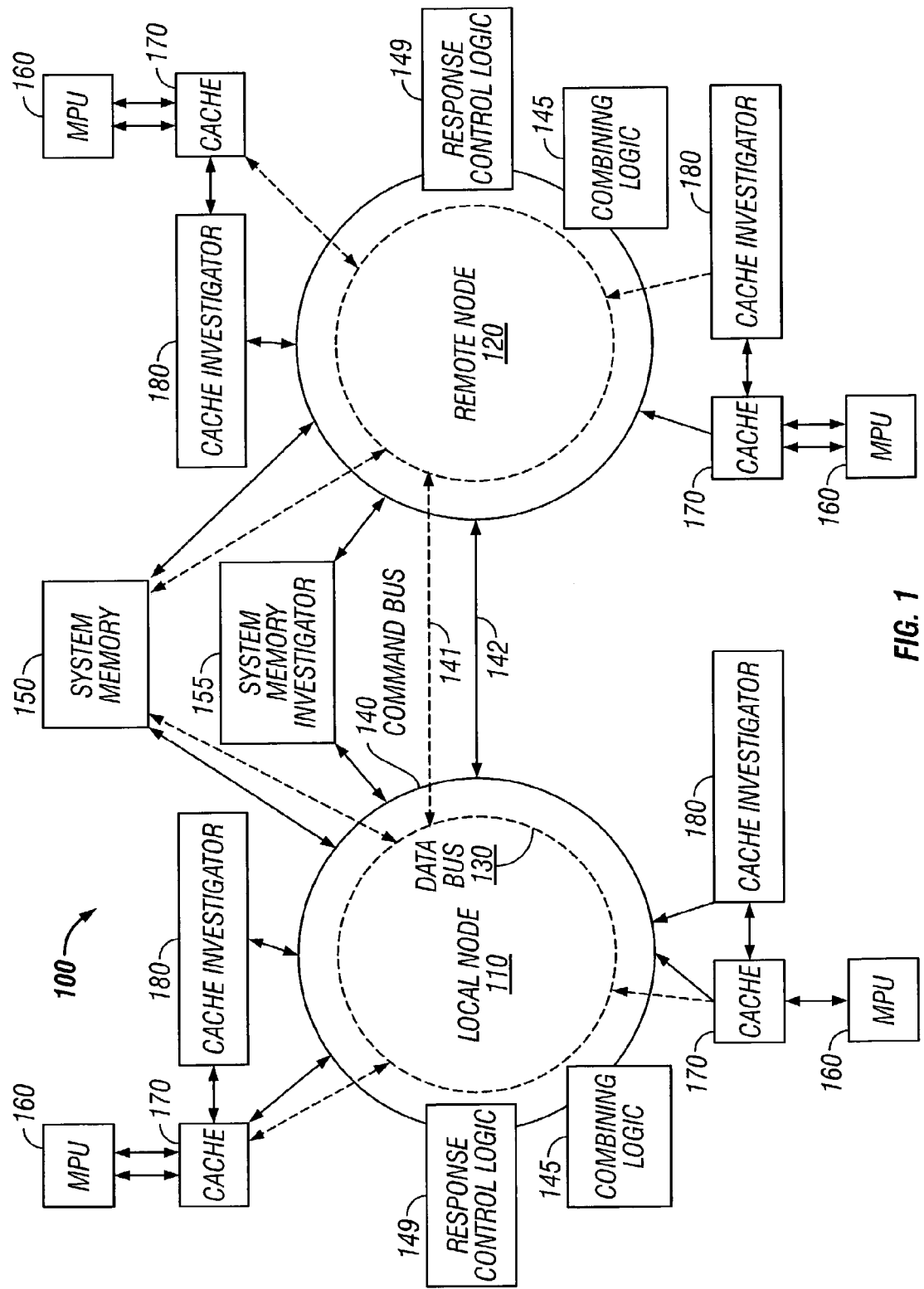
FIG. 1 schematically illustrates coupled local and remote bus rings, both comprising at least one cache and an associated cache investigator.

Turning now to FIG. 1, disclosed is a bus system 100. The system 100 comprises a local node 110 coupled to a remote node 120. The local node 110 and the remote node 120 each further comprise two component bus rings designated as data bus 130 and command bus 140. The command bus 140 further comprises two sub-buses. These are a query bus and the reply bus (not shown). Generally, the query bus is employable to convey data transfer requests, and the reply bus is employable to carry status and utilization parameters associated with the data transfer request to an element of the system 100. There are also two-way connections 141, 142 between the local node 110 and the remote node 120 for both the data bus 130 and the command bus 140.

The local node 110 and the remote node 120 further each comprise a plurality of MPUs 160 and their associated caches 170. The caches 170 are coupled to both the data bus 130 and the command bus 140 of the local and remote nodes 110, 120. Typically, each MPU 160 is coupled to its associated cache 170. A cache investigator 180 is also associated with each cache 170 and is coupled to both the cache 170 and the command bus 140 of each node 110, 120.

Generally, the cache investigator 180 determines the status of requested information within the associated cache 170. When the cache investigator 180 receives a request for a specific piece of information, typically the cache investigator 180 determines whether the associated cache 170 has that piece of information. As will be understood by those of skill in the art, the coherency state of the data copy in the cache 170 can be designated as "exclusive" (that is, no other copy exists in other caches 170 of the system 100), "modified" (that is, the data is modified in the associated cache 170, but has not been copied into a second cache 170) or "shared" (that is, a copy of that data could exist in another cache 170). The cache investigator 180 is further employable to measure aspects of the utilization of the associated cache 170, and to transmit these measurements onto the reply bus of the local and remote nodes 110, 120.

In the system 100, a plurality of data caches 170 could have a copy of the unmodified data, which is also resident in the shared memory 150. However, when a copy of information stored in the cache 170 is to be modified, only one copy is permitted to exist in the caches 170 at any given time. Any other copies of the data are therefore invalidated (that is, are not to be used by any MPU 160) before the data copy in the cache 170 is modified.

Generally, when an MPU 160 requests data, it checks its associated cache 170 to determine whether the cache 170 has a copy of the desired data in the appropriate state, the desired state as a function of the request. For instance, if the request is a read request, then the appropriate state can be shared, exclusive or modified. The processor 160 employs the data in the associated cache 170 without making a request for data on the coupled command bus 140. However, if the data is not found in the associated cache 170 in the appropriate state, the cache investigator 180 transmits a request for this information on the command bus 140. The request also comprises information related to the function that the requesting MPU 160 is to perform. That is, whether the requesting MPU 160 is to read the data, modify the data, or both.

The request bus of the local command bus 140 carries the data request and other associated information, such as the requestor identification, the memory address that is requested, the type of request (read or write), and so on. The request is then broadcast to each cache investigator 180 on both the local node 110 and the remote node 120 through the two-way connections 141, 142, as well as to the system memory 150. In the illustrated embodiment, the system memory 150 is coupled between the local node 110 and the remote node 120. The system memory 150 is coupled to both the command buses 140 and data buses 130 of the local node 110 and the remote node 120. In a further embodiment, the system memory 150 is partitioned across a plurality of nodes, both local and remote. The system memory has an associated system memory investigator 155, which is similar to the cache investigator 180. The system memory investigator is also coupled to the command bus 140, of the local node 110 and the remote node 120.

After receiving a request for a data transfer, each cache investigator 180 could find that there is no copy of the requested data in its associated cache 170. Alternatively, each cache investigator 180 could find that a copy of the data in the associated cache 170 exists, and that the requested data is shared data, exclusive data or modified data. The cache investigator 180 is employable in the selection of one of several data transfer options as a function of the status of the data within the associated cache 170.

Furthermore, the cache investigators 180 are employable to generate cache utilization parameters for their associated caches 170. These cache utilization parameters can comprise such measurements as the frequency of access of the associated cache 170 by its associated MPU 160, the frequency of requests for data transfers from other caches 170 to the associated cache 170, the frequency of transfers from the associated cache 170 to other caches 170, the frequency of system memory 150 requests by the associated cache 170, the number of pending requests at the time the request is received, and so on.

In one embodiment, if the cache investigator 180 is too busy to take any action on the received data requests, it places a "retry" response on the reply ring of the command bus 140. "Retry" generally means that the requesting MPU 160 is to resend the data transfer request at a later time. However, if the cache investigator 180 is not too busy, it responds to the request with the information regarding the status of the requested information within associated cache 170 and the cache utilization parameters.

If the cache 170 does not have the requested data, the associated cache investigator 180 transmits a notification of this fact onto the command bus. However, if the associated cache 170 has the requested data, this fact is also transmitted on the command bus 140, along with the state of the data. For instance, if the requestor MPU 160 is to read or modify the data, and the copy of the data in the associated cache 170 is in a modified status, the cache investigator 180 sends a response on the response bus indicating a modified cache status. In this case, no other cache 170 has a copy of the data. Therefore, every other cache investigator 180 would respond that its associated cache 170 does not have the requested data.

The cache investigator 180 also collects and broadcasts the cache utilization parameters onto the command bus 140. The cache utilization parameters are employed by the combining logic 145 of the same node that comprises the requesting MPU 160. The combining logic 145 employs the responses from all of the cache investigators 180 associated with the plurality of MPUs 160. These cache investigator responses are then evaluated according to certain criteria, such as the relative time of a data transfer from a cache 170 on the remote node to the cache 170 on the local node versus the time it takes to get the same information from the system memory 150. The response combining logic 145 is employable to make this determination and transmits this determination to the response control logic 149.

Generally, the response control logic 149 controls address and data flow among the processors, and between the processors and the shared memory. The response control logic 149 then broadcasts a point-to-point (PTP) transfer request to all caches 170 in both nodes 110, 120. The PTP request carries information, such as which of the cache investigators 180 is responsible to send the data to the requesting MPU 160. The PTP request can also carry to the source cache 170 what the eventual state of the copied data is to be. In other words, the copied data from the cache 170 is to be designated as shared if the requesting MPU 160 is to read the data, or designated as modified if the requesting MPU 160 is to write the data.

In one example, the requesting MPU 160 is to read data, but the data is not within its associated cache 170. The cache investigator 180 therefore sends a request for the information on the request bus of the command bus 140, which is broadcast to all cache investigators 180 on both the local and remote nodes 110, 120. The cache investigators 180 each determine the cache utilization parameters of their associated cache 170, as well as the data status.

This information is then sent on the response bus of the command bus 140 and finds its way back to the combining logic 145 of the node 110, 120 associated with the request. If a status from a cache indicates an unmodified status, the cache utilization parameters are then sorted and weighed by the combining logic 145, and a selection is made whether to transmit the unmodified copy of the data from the cache 170 to retrieve the data from the shared memory 150. If the combining logic 145 determines that, given the utilization parameters of the caches 170 and the system memory 150, it is faster to transfer the data from the system memory 150, the combining logic 145 so notifies the response control logic 149. The controlling logic 149 then sends the appropriate response that indicates to the shared memory 150 to send the data to the requestor. If the combining logic 145 determines that it is faster to get the requested data from a cache 170, it so notifies the response control logic 149 that this is to be done. The cache 170 can be a local cache or a remote cache, depending upon the result received by the response control logic 149.

Figure 2:
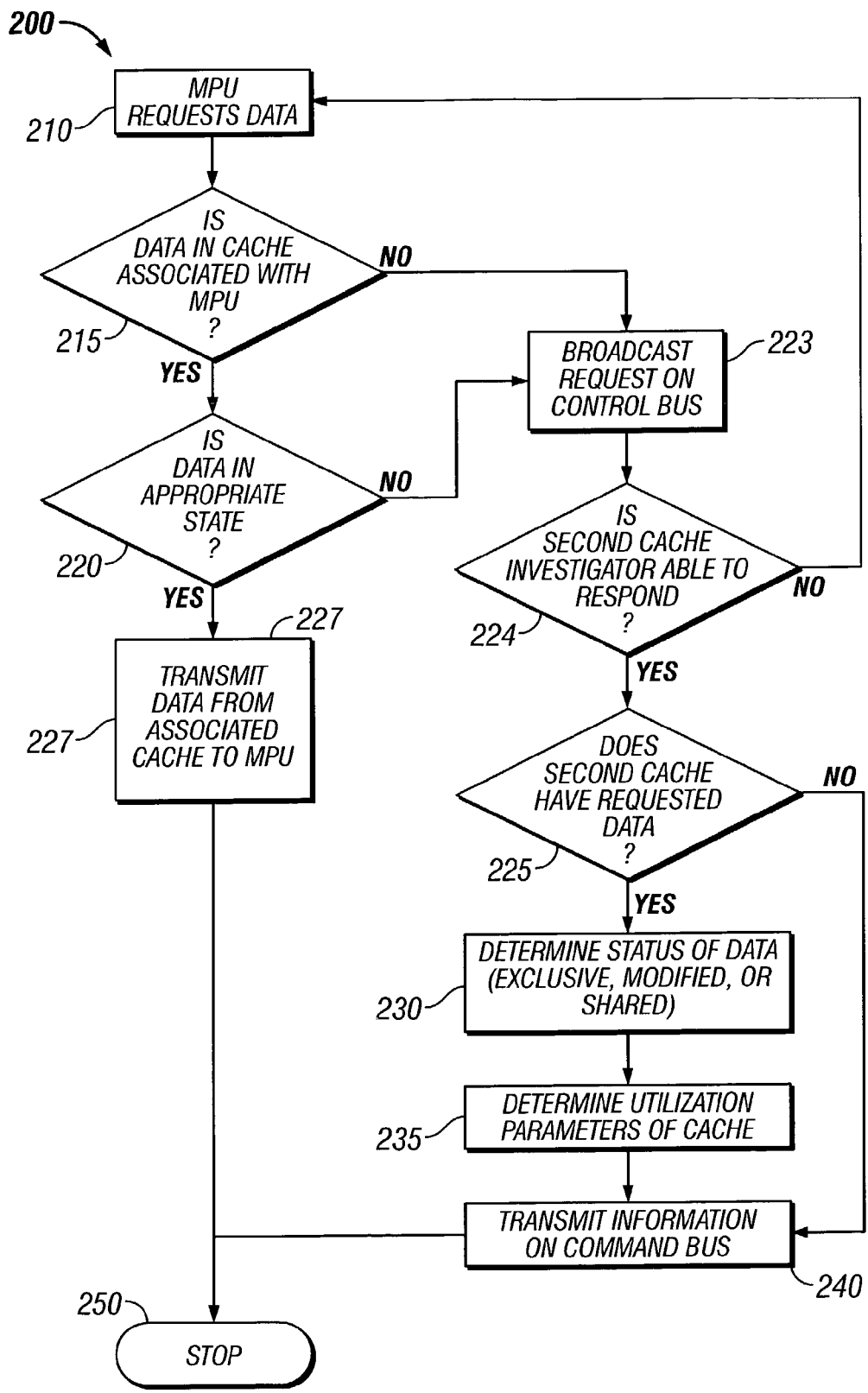
FIG. 2 illustrates a method for creating and broadcasting cache status and cache and system memory utilization information.

In a further embodiment, when the system memory 150 first receives a request for data on the command bus 140, the system memory investigator 155 responds with indicia associated with the utilization parameters of the system memory 150. The system investigator 155 then awaits the broadcast command from the response control logic 149 to determine whether or not to retrieve the requested information from the system memory 150. The system memory investigator 155 can make such measurements as frequency of access of the system memory 150 by any coupled MPU 160, the number of pending requests, and so on Turning now to FIG. 2, illustrated is a method 200 for generating and broadcasting cache status and cache and system memory utilization information. In step 210, an MPU 160 requests data to process. In step 215, the associated cache investigator 180 determines whether the requested data is in the associated cache 170. If the data is in the associated cache 170, the cache investigator determines whether the data in the associated cache 170 is "exclusive" data in step 220. If the data in the cache 170 is exclusive data, then in step 227, the data from its associated cache is transmitted to the MPU 160, and the method 200 ends in step 250.

However, if the data requested is not in the associated cache 170 of the MPU 160, then a request for the data is broadcast on the command bus 140 by the associated cache investigator 180 in step 223. Alternatively, although the requested data is found in the associated cache 170, if the data does not have exclusive status, step 223 is also executed, and a request for data is broadcast on the command bus 140 to other cache investigators 180 associated with other caches 170. This data transfer request is also transferred across to the other command bus 140 through the employment of the two-way connection 142.

In step 224, a second cache investigator 180 receiving the data request determines whether it has the capability of responding to a request for an investigation of its associated cache 170 (that is, a second cache 170). If the second cache investigator 180 does not have the capacity, it broadcasts a message on the command bus 140 that it cannot presently check its associated cache 170 for this information. After being informed of the lack of responsiveness by the second cache investigator 180, the MPU 160 once again requests the data in a step 210.

"In step 225, the second cache 170 is queried by its associated cache investigator, which is the second cache investigator 180, to determine whether the second cache 170 has the requested data. In one embodiment, the second cache 170 can be on either the local node 110 or the remote node 120. If the second cache 170 does not have the requested information, an indicia of this determination is placed on the command bus 140 in step 240, and the method ends in step 250."

However, if the second cache 170 does have the requested information, its associated cache investigator 180 determines whether this information is designated as exclusive, modified, or shared, in step 230. In step 235, the cache investigator 180 measures the cache utilization parameters of its associated cache 170, the second cache 170. These cache utilization parameters can comprise such measurements as frequency of access by a coupled MPU 160, frequency of requests for data transfers from other caches 170 to the second cache 170, frequency of transfers from the second cache 170 to other caches 170, frequency of system memory 150 requests, the number of pending requests, and so on. In step 240, the second cache investigator 180 broadcasts the cache information status and the cache control parameters onto its command bus 140, which is coupled to both the local and remote buses 110, 120 through the two-way connection 142. In step 250, the method 200 stops. In other words, there is no more investigation to be performed by the second cache investigator 180 of its associated cache 170 for a given data request.

Figure 3:
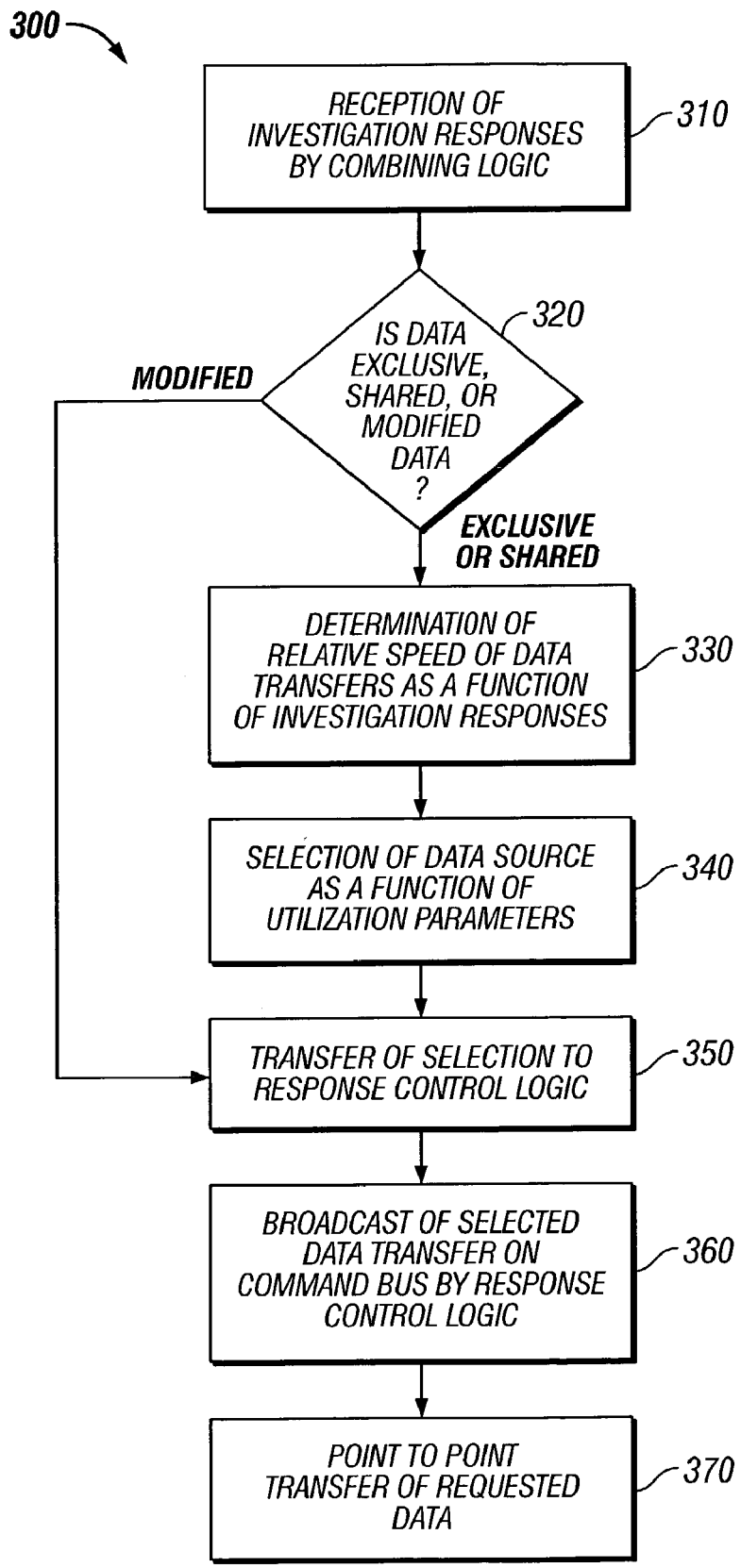
FIG. 3 illustrates a method for employing the cache status and cache and system memory utilization information.

Turning now to FIG. 3, disclosed is a method 300 for employing indicia of the status of the requested data and the utilization parameters. In step 310, the combining logic 145, of the same node upon which the requesting MPU 160 resides, receives the status of the data from the various caches 170 and the utilization parameters. In one embodiment, the utilization parameters comprise cache 170 utilization parameters. In another embodiment, the utilization parameters comprise system memory 150 utilization parameters.

In step 320, the combining logic 145 determines if the requested data within a cache was determined to be exclusive, shared or modified by the various cache investigators 180. If the requested data is modified data, the combining logic 145 notifies the response control logic 149 in step 350. The response control logic 149 then commands the data transfer to occur from the source cache to the data destination in step 360. In one embodiment, the data destination is the cache associated with the requesting MPU 160. The PTP data transfer then occurs in step 370.

However, if the response associated with a cache 170 of the system 100 is designated as either exclusive or shared, the combining logic 145 employs the utilization parameters to determine calculations of merit of data transfer. These calculations of merit can comprise the relative time of transfer of data from a data source, such as the second cache 170 or the system memory 150 to the requestor, and so on.

In step 340, a source of the unmodified data is selected by the combining logic 145 as a function of the utilization parameters employed in step 330. If the time required for transfer of the requested data is less from the system memory 150 to the data destination than from a first cache 170 to the data destination, the combining logic 145 generates such an indicia, and commands the response control logic 149 to command the faster data transfer. However, if the time of transfer is less to transfer data from a first cache 170 to the data destination than from the system memory 150 to the data destination, the combining logic 145 generates such an indicia instead. The response control logic 149 then commands the data transfer to occur from the source cache 170 to the data destination, such as a destination cache, in step 360. In one embodiment, the data destination is the cache associated with the requesting MPU 160. The PTP data transfer then occurs in step 370. The PTP data transfer can be from shared memory 150 to the data destination, or from the cache 170 to the data destination, as determined in step 340.

It is understood that the present invention can take many forms and embodiments. Accordingly, several variations may be made in the foregoing without departing from the spirit or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of embodiments. Accordingly, it is appropriate that the appended claims be construed broadly and in a manner consistent with the scope of the invention.

What is claimed is:

1. An apparatus for efficiently transmitting data in a bus system having at least one processor coupled to at least two data sources, comprising:
    means for generating, on a bus, a request for data to be transmitted to a destination;
    means for receiving by at least two investigators the request, wherein each investigator is associated with a data source;
    in response to receiving the request, means for determining by the investigators if each's associated data source has the data;
    for each data source having the data, means for determining, by the investigator associated with the data source, utilization parameters for the data source and a status of the data;
    means for transmitting on the bus the status of the data and utilization parameters for each data source having the data;
    for each data source having non-modified data, means for determining a speed to transfer the data from the data source to the destination based on the utilization parameters; and
    means for transmitting on the bus the data from the data source having the fastest relative speed to the destination.

2. The apparatus of claim 1, wherein the processor generates the request, and the destination comprises either a cache that is associated with the processor or the processor.

3. The apparatus of claim 1, wherein the data sources comprise a cache or system memory.

4. The apparatus of claim 1, wherein in response to the data being modified, means for transmitting, from the data source having the modified data, the modified data to the destination.

5. The apparatus of claim 1, further comprising:
    means for receiving, by a local investigator associated with a local data source, the request;
    means for determining by the local investigator if the local data source has the data; and
    in response to the local data source having the data, means for transmitting the data from the local data source to the destination.

6. The apparatus of claim 5, wherein the local data source comprises a cache and the destination comprises the processor.

7. The apparatus of claim 1, wherein the status of the data comprises one of modified data, exclusive data, or shared data.

8. The apparatus of claim 1, wherein the utilization parameters comprise, for each data source, one or more of frequency of access by the processor to the data source, frequency of requests for transfers of data by the data source to a second data source, frequency of transfers of data from the data source to other data sources, and number of pending requests.

9. The apparatus of claim 1, wherein a combining logic, coupled to the processor and bus, determines the speed to transfer the data from the data source to the destination based on the utilization parameters.

10. The apparatus of claim 9, wherein response control logic, coupled to the combining logic, commands the data source having the fastest relative speed to transmit the data to the destination.

11. The apparatus of claim 1, further comprising a local node coupled to a remote node, wherein the at least two data sources are directly coupled to the local node and/or the remote node.

12. The apparatus of claim 3, wherein a system memory investigator determines utilization parameters of the system memory.

13. A method for efficiently transmitting data in a bus system having at least one processor coupled to at least two data sources, comprising the steps of:
    (1) generating, on a bus, a request for data to be transmitted to a destination;
    (2) receiving by at least two investigators the request, wherein each investigator is associated with a data source;
    (3) in response to receiving the request, determining by the investigators if each's associated data source has the data;
    (4) for each data source having the data, determining, by the investigator associated with the data source, utilization parameters for the data source and a status of the data;
    (5) transmitting on the bus the status of the data and utilization parameters for each data source having the data;
    (6) for each data source having non-modified data, determining a speed to transfer the data from the data source to the destination based on the utilization parameters; and
    (7) transmitting on the bus the data from the data source having the fastest relative speed to the destination.

14. The method of claim 13, wherein the processor generates the request, and the destination comprises either a cache that is associated with the processor or the processor.

15. The method of claim 13, wherein the data sources comprise a cache or system memory.

16. The method of claim 13, further comprising the step of: in response to the data being modified, transmitting, from the data source having the modified data, the modified data to the destination.

17. The method of claim 13, further comprising the steps of:
- receiving, by a local investigator associated with a local data source, the request;
- determining by the local investigator if the local data source has the data; and
- in response to the local data source having the data, transmitting the data from the local data source to the destination and bypassing steps 2–7 in claim 13.

18. The method of claim 17, wherein the local data source comprises a cache and the destination comprises the processor.

19. The method of claim 13, wherein the status of the data comprises one of modified data, exclusive data, or shared data.

20. The method of claim 13, wherein the utilization parameters comprise, for each data source, one or more of frequency of access by the processor to the data source, frequency of requests for transfers of data by the data source to a second data source, frequency of transfers of data from the data source to other data sources, and number of pending requests.

21. The method of claim 13, wherein a combining logic, coupled to the processor and bus, determines the speed to transfer the data from the data source to the destination based on the utilization parameters.

22. The method of claim 21, wherein response control logic, coupled to the combining logic, commands the data source having the fastest relative speed to transmit the data to the destination.

23. A computer program product for efficiently transmitting data in a bus system having at least one processor coupled to at least two data sources, the computer program having a medium with a computer program embodied thereon, the computer program comprising:
- computer code for generating, on a bus, a request for data to be transmitted to a destination;
- computer code for receiving by at least two investigators the request, wherein each investigator is associated with a data source;
- in response to receiving the request, computer code for determining by the investigators if each's associated data source has the data;
- for each data source having the data, computer code for determining, by the investigator associated with the data source, utilization parameters for the data source and a status of the data;
- computer code for transmitting on the bus the status of the data and utilization parameters for each data source having the data;
- for each data source having non-modified data, computer code for determining a speed to transfer the data from the data source to the destination based on the utilization parameters; and
- computer code for transmitting on the bus the data from the data source having the fastest relative speed to the destination.

24. The computer program product of claim 23, wherein:
- the status of the data comprises one of modified data, exclusive data, or shared data; and
- the utilization parameters comprise, for each data source, one or more of frequency of access by the processor to the data source, frequency of requests for transfers of data by the data source to a second data source, frequency of transfers of data from the data source to other data sources, and number of pending requests.

* * * * *